Dec. 24, 1963   D. S. DENCE   3,115,204
POWER WHEEL ASSEMBLY
Filed Nov. 16, 1960   2 Sheets-Sheet 1
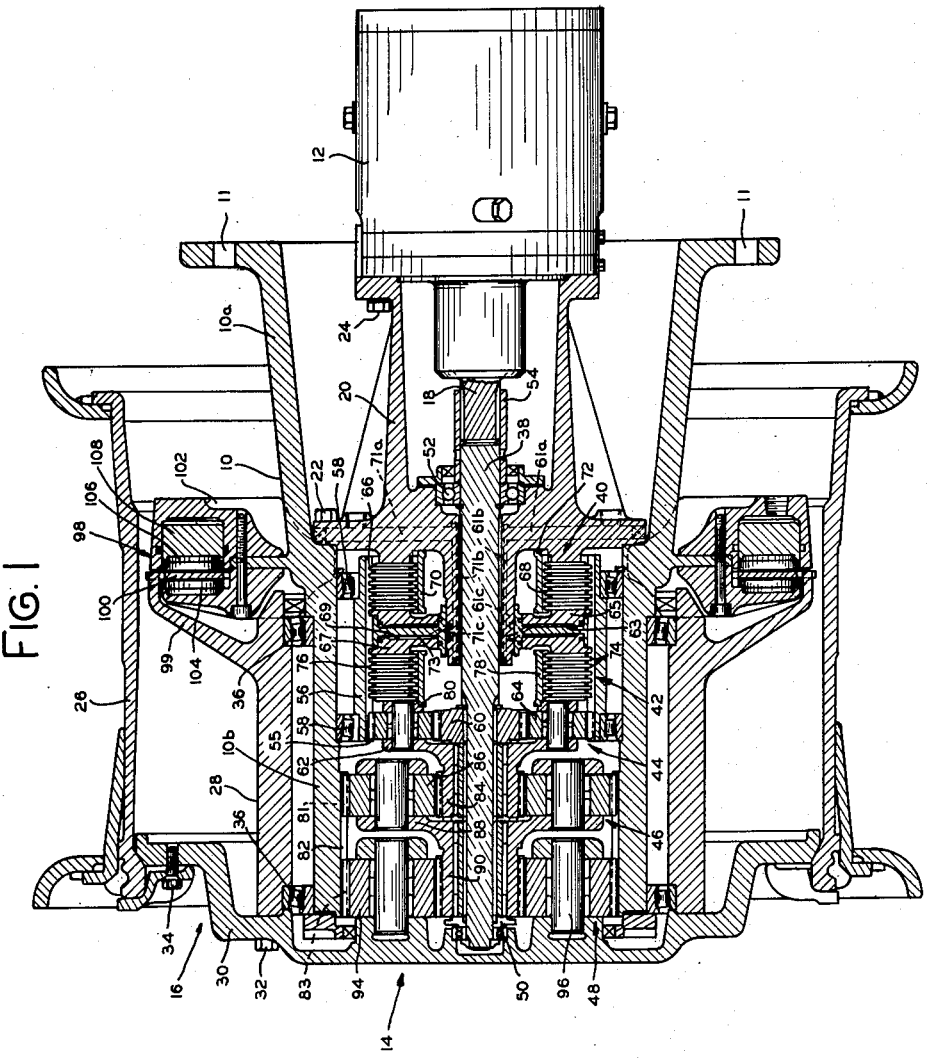
FIG. I
INVENTOR.
DONALD S. DENCE
BY
Kenneth C. Witt
ATTORNEY

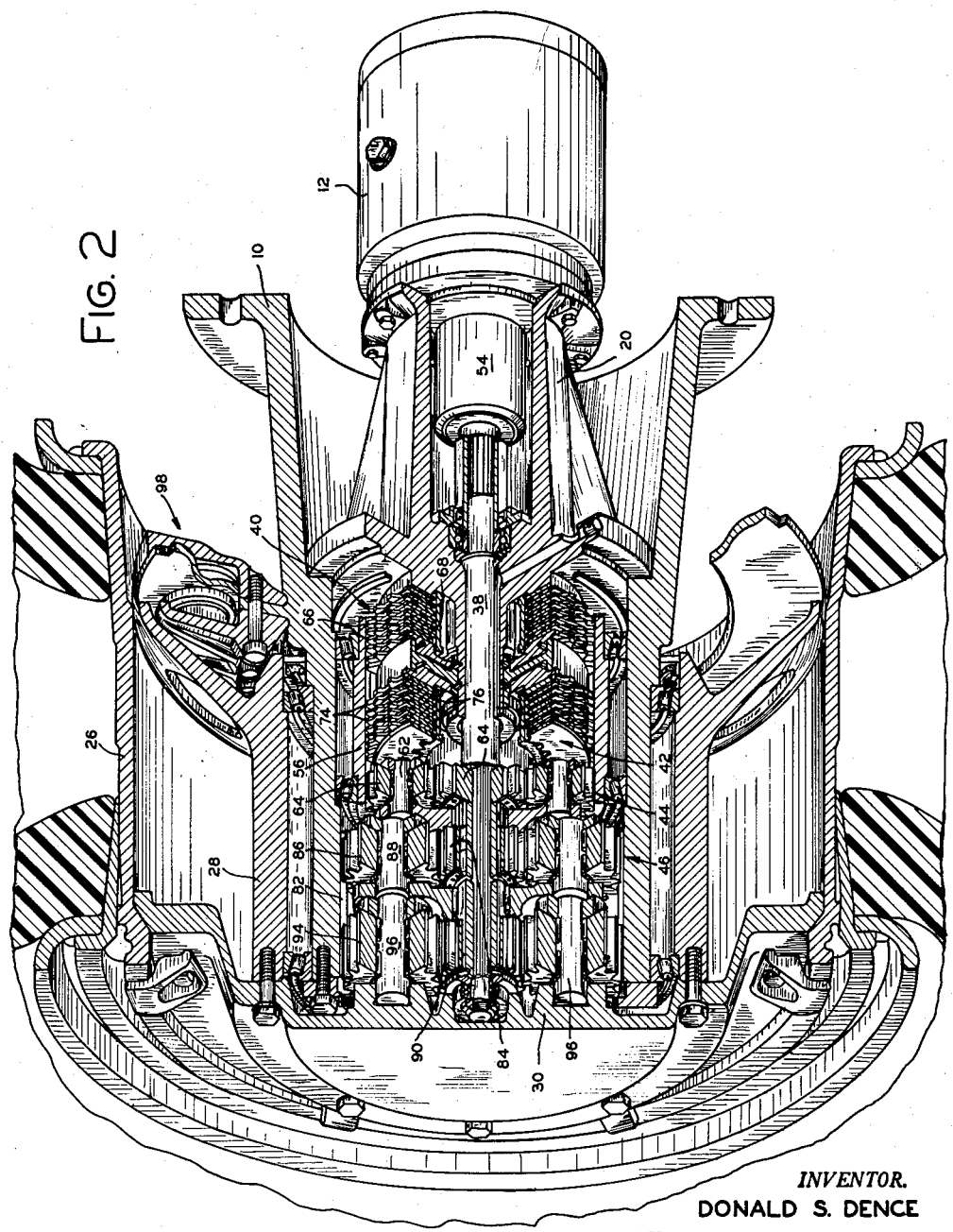

3,115,204
POWER WHEEL ASSEMBLY
Donald S. Dence, Jackson, Mich., assignor to Clark
Equipment Company, a corporation of Michigan
Filed Nov. 16, 1960, Ser. No. 69,692
8 Claims. (Cl. 180—10)

This invention relates to power wheel assemblies, and more specifically to power wheel assemblies embodying a change speed transmission as a portion thereof.

It will be appreciated by those familiar with such mechanisms that a power wheel assembly imposes severe limitations upon the amount of space available in which to locate the drive motor and constituent components of the assembly. The object of this invention is to provide a power wheel assembly embodying a change speed transmission plus additional gear reduction means, a brake mechanism and other parts within the rim of the wheel, all in a structure which is readily manufactured and assembled and at the same time is rugged and reliable.

In carrying out my invention in one preferred form, I provide a wheel hub mounted rotatably on a wheel support member which is adapted to be fixedly attached to a vehicle. Disposed within the support member is a change speed transmission and gear reduction mechanism comprising three planetary gear sets connected in series. The first planetary gear set is provided with a clutch and a brake which can be operated to transmit power directly through the first gear set, multiply torque as the first gear set transmits power, or to transmit no power. The third planetary gear set, which serves together with the second planetary gear set to provide gear reduction and torque multiplication, has its output elements connected to the wheel hub in order to transmit power from the transmission and reduction gear mechanism to the wheel hub. Connected to the support member is a motor which supplies power to the transmission and reduction gear mechanism and hence to the wheel hub.

The foregoing and other objects, advantages and features of my invention will become more readily apparent from the following detailed description taken in conjunction with the drawing in which:

FIGURE 1 is a side elevation which is in section except for the hydraulic motor of a preferred form of my invention, and FIGURE 2 is a perspective partially cutaway view of a preferred form of my invention.

Referring to the drawing, the numeral 10 denotes an annular wheel support member having an inner frusto conical portion 10a (the right portion in FIG. 1) and an outer cylindrical portion 10b. The support member 10 is adapted to be attached to a vehicle (not shown) by any suitable means, such as bolting through openings 11. Suitable motor means 12 is mounted on support member 10 by means of an annular bracket member 20 which is secured to the inner portion of support 10 by means of machine screws 22 and extends outwardly to the right where the motor is secured by machine screws 24. The power means 12 may, for example, be an hydraulic motor, and reference is made to a co-pending application Serial No. 109,421, filed May 11, 1961, owned by the assignee of the present application which shows a vehicle and hydrostatic drive system with which the present invention may be used advantageously.

The motor 12 through its output shaft 18 and an intervening change speed transmission and gear reduction mechanism indicated generally by the numeral 14 rotates a wheel hub 16 which is supported by the support member 10 and mounted for rotation thereon. While the mechanism 14 is sometimes referred to hereinafter in this description merely as a transmission, it should be understood that the mechanism 14 includes both a change speed transmission and a gear reduction mechanism, and the details of the two portions of the mechanism 14 are explained in detail hereinafter.

The wheel 16 comprises an outer rim portion 26, an inner drum portion 28 and an end plate 30. The inner and outer portions 26 and 28 are interconnected by the plate member 30 and are attached thereto by any suitable means, such as machine screws 34 and 32. The wheel 16 is rotatably mounted on the support member 10 by means of a pair of spaced-apart tapered roller bearings 36 disposed between the inner drum portion 28 and the support member 10.

The change speed transmission and gear reduction mechanism 14 is located within the support member 10 between the motor mounting bracket 20 and the end plate 30. The mechanism 14 comprises, generally, a rotatable input shaft 38 located coaxially of the support member 10, a pair of multiple disc friction devices 40 and 42 and three planetary gear sets 44, 46 and 48 connected in series. The friction devices 40 and 42 and the gear sets 44, 46 and 48 are all mounted in axial spaced relationship.

The input shaft 38 is journaled at its outer end in the end plate 30 by a ball bearing 50 and at the other end in the mounting bracket 20 by ball bearing 52. The input shaft 38 is operatively connected to the output shaft 18 of the motor 12 by any suitable means such as a coupling 54.

The first gear set 44 comprises a sun gear or input element 60 splined to shaft 38 for rotation therewith, a planet carrier or output element 62 having a plurality of planet pinions 64 rotatably mounted thereon in mesh with sun gear 60, and a ring gear 55 integrally formed at the outer end of a clutch drum 56, the planet pinions 64 also being in mesh with ring gear 55.

As mentioned previously there are two friction devices associated with gear set 44. The friction device 40 acts as a brake for drum 56, holding ring gear 55 when required in order to cause the ring gear to act as a reaction member and produce the transfer of energy by gear set 44 at reduced speed and multiplied torque. The brake 40 comprises a set of discs 66 splined to the drum 56 and interleaved with another set of discs 68 splined to a hub member 70 which in turn is secured to the bracket member 20 by means of a spline connection at 72. The brake 40 is applied by the application of pressure to the disc assembly 66, 68 by a piston 65. The piston 65 is actuated by means of hydraulic fluid admitted to chamber 63 by means of passages 61a and 61b in bracket member 20 and passage 61c in web member 73 which is secured to drum 56 and rotates therewith. It will be readily appreciated that such pressurized fluid is admitted for applying the clutch upon the actuation by the operator of the vehicle of a suitable control valve (not shown).

The other friction device 42 acts as a clutch and comprises a set of discs 74 splined to drum 56 and interleaved with a set of discs 76 splined to a hub member 78 which is connected to planet carrier 62 by suitable means such as a spline connection at 80. The clutch 42 is applied by means of a piston 67 compressing the disc assembly 74, 76, upon admission of pressurized fluid to chamber 69 through a plurality of passages including 71a, 71b and 71c, the first two of these passages being in bracket 20 and the last mentioned passage being located in an annular web member 73.

When the clutch 42 is actuated, the ring gear 55 is connected to the planet carrier 62, thus locking up the gear set 44 and causing all elements thereof to rotate as a unit when motor 12 is in operation. It will be appreciated that when neither brake 40 nor clutch 42 is engaged, no power is transmitted through the transmission and gear reduction mechanism.

The second gear set 46 includes a ring gear portion or reaction element 81 which is formed integrally on the inner surface of support member 10. Actually, as shown, a set of elongated teeth 82 is cut on the inner surface of support member 10 and the inner ends of these teeth serve as ring gear 81 for gear set 46 while the outer ends of the teeth serve as ring gear 83 for gear set 48. The gear set 46 also includes a sun gear or input element 84 rotatably mounted on shaft 38, and preferably sun gear 84 is formed integrally on the same member forming planet carrier 62. Also as a part of gear set 46, a plurality of planet pinions 86 are rotatably mounted on a planet carrier 88, the planet pinions meshing with both ring gear 81 and sun gear 84, and the planet carrier 88 serving as the output element of gear set 46.

The third gear set 48 comprises, in addition to the ring gear 83, a sun gear or input element 90 which is rotatably mounted on the shaft 38 and connected, preferably integrally, to the planet carrier 88 in order to trasmit torque from the gear set 46 to the gear set 48, and a plurality of planet pinions 94 intermeshing with the sun gear 90 and the ring 83 and rotatably mounted in equi-spaced relationship on a plurality of axially extending pins 96. The pins 96 are connected to the end plate 30 and serve to transmit the torque from the gear set 48 to the end plate 30. By virtue of the fact that ring gear 82 is always stationary and is also common to both the second and third gear sets 46 and 48, both the second and third gear sets 46 and 48 always act as speed reduction mechanisms, thereby sequentially multiplying torque.

A known type of "spot" brake 98 is disposed between the outer rim 26 and the support member 10. A portion 99 of the brake is connected to or formed integrally with hub member 28 and rotates therewith. Portion 99 carries an annular disc 100. Another portion 102 of the brake is secured to the support member 10, and portion 102 includes a plurality of pairs of friction elements 104 and 106 disposed on opposite sides of disc 100 and arranged to be pressed against the disc by means of hydraulically actuated pistons 108 to retard and stop the rotation of wheel 16.

In the operation of my invention, assume first that neither brake 40 nor clutch 42 is actuated. In this circumstance no power is delivered by the motor to the wheel 16 even though the motor 12 is operating. In other words, the power wheel assembly is in neutral in this condition. When the brake 40 is actuated, the first gear set 44 serves as a speed reduction mechanism whereby energy is transmitted from the motor 12 to the wheel 16 through the three gear sets in sequence, each set providing a gear reduction and torque multiplication. In a typical embodiment of this invention, the first gear set provides a gear reduction of 3.45:1, the second gear set provides a reduction of 4.33:1, and the third gear set provides a reduction of 4.33:1, or a total reduction under this condition of operation of 64.77:1.

When brake 40 is released and clutch 42 is engaged, the first gear set 44 is locked up as indicated previously, and under this condition the torque of motor 12 is transmitted directly to the second gear set and thence through the third gear set to the wheel 16. This provides a second speed of operation of the wheel 16 with a total reduction between the motor and wheel of 18.75:1. It will be readily appreciated that the speed of motor 12 may be varied to provide a speed range for the wheel 16 in either of the operating conditions just described.

It will be appreciated from the foregoing that this invention provides a power wheel construction which is compact and rugged because of the use of the inner surface of the support member as the ring gear for two of the gear sets and because of the construction and arrangement of the other components of the mechanism. Because of the large gear reduction which can be provided in this compact mechanism, it is possible to use a higher speed and thereby smaller, less expensive and lighter weight motor 12 than otherwise would be the case.

While I have described and illustrated herein a preferred form of the invention, it will be readily understood that modifications may be made by those skilled in the art without departing from the invention. I intend to cover by the appended claims all such modifications which fall within the true spirit and scope of this invention.

I claim:

1. A power wheel assembly comprising an annular wheel support member adapted to be attached to and form a part of a vehicle, a wheel structure surrounding the said wheel support member and arranged for rotation thereon, motor means carried by the wheel support member adjacent one end thereof, a change speed transmission housed within the said wheel support member and connected to the said motor means, the said change speed transmission including means for selectively changing the speed ratio between the said motor means and the said wheel structure, and connecting means at the other end of the wheel support member interconnecting the said change speed transmission and the said wheel structure for operation of the wheel structure by the motor through the medium of the change speed transmission.

2. For use with a vehicle, a power wheel assembly comprising an annular wheel support member adapted to be fixedly attached to the vehicle, a motor, a mounting member for mounting said motor on said support member, a wheel hub rotatably mounted on said support member, said wheel hub having an end plate connected thereto, and a transmission disposed within said support member for transmitting power from said motor to said wheel hub comprising a pair of friction devices and first, second and third planetary gear sets connected in series, said first gear set including input, output, and reaction elements, said input element being operatively connected to said motor, said reaction element being selectively connectible to said mounting member by means of one of the said friction devices whereby the reaction element is held stationary thus effecting a speed reduction through said first gear set, said output element being selectively connectible to said reaction element by means of the other of the said friction devices whereby the output and reaction elements rotate together thus locking up said first gear set, and the said third gear set including an output element connected to said end plate whereby power is transmitted from the said motor through said transmission for operating the said wheel hub.

3. A power wheel assembly comprising wheel support means, power means comprising a motor, means for mounting said motor on said support means, a wheel hub rotatably mounted on said support means, and power transmission means disposed within said support means for transmitting power from said motor to said wheel hub, said transmission comprising a plurality of planetary gear sets connected in series, one of said gear sets being actuatable to transmit power as a speed reduction mechanism or as a direct drive mechanism, another of the said gear sets being connected to the wheel hub, and means for actuating said one gear set whereby the power wheel assembly can be placed selectively in a neutral condition, a first speed condition or a second speed condition.

4. A power wheel assembly comprising a wheel support member, a motor, a mounting member for mounting said motor on said support member, a wheel hub rotatably mounted on said support member, said wheel hub having an end plate connected thereto, and a transmission disposed within said support member and between said mounting member and said end plate for transmitting power from said motor to said wheel hub, said transmission comprising a plurality of planetary gear sets connected in series, the first of the gear sets in said series being connected to the said motor, the said first gear set being actuatable to transmit power selectively as a direct drive mechanism and as a speed reduction mechanism, and the last gear set in the said series being connected to the said end plate in order to transmit power from said transmission to said wheel hub.

5. A power wheel assembly comprising an annular wheel support member adapted to be attached to and form a part of a vehicle, a wheel structure surrounding the said wheel support member and arranged for rotation thereon, a motor carried by the said wheel support member, a change speed transmission and gear reduction mechanism comprising a pair of multiple disc friction devices and three planetary gear sets located within the said wheel support member, each planetary gear set having a sun gear, a ring gear and planet pinions mounted on a planet carrier and in mesh with both the sun gear and ring gear, means interconnecting the said motor and the sun gear of the first planetary gear set, the planet carrier of the first gear set being connected to the sun gear of the second gear set, the planet carrier of the second gear set being connected to the sun gear of the third gear set, the planet carrier of the third gear set being connected to the said wheel structure, a drum member interconnecting the ring gear of the said first gear set and each of the said two friction devices, selective means for actuating a first one of the said friction devices for holding the said drum member against rotation whereby the said first ring gear serves as a reaction member for the first gear set and the said motor operates the said wheel structure through a triple gear reduction, and additional selective means for actuating the other friction device for locking up the first gear set whereby the said motor operates the said wheel structure through a double gear reduction.

6. A power wheel assembly comprising an elongated annular wheel support member, mounting means at the iner end of the said wheel support member whereby the wheel support member is adapted to be attached to and form part of a vehicle with the axis of the wheel support member horizontally disposed, a wheel structure surrounding the said wheel support member and arranged for rotation thereon, the said wheel structure comprising an outer rim portion, an inner drum portion adjacent the said wheel support member and an end plate interconnecting the said rim portion and the said inner drum portion and extending over the outer end of the wheel support member, motor mounting means secured within the said wheel support member adjacent the inner end thereof, a motor mounted on the said motor support means, a pair of multiple disc friction devices and three simple planetary gear sets arranged seriatim between said motor mounting means and said end plate, each planetary gear set having a sun gear, a ring gear and planet pinions mounted on a planet carrier and in mesh with both the sun gear and ring gear, a shaft extending through the said two friction devices and interconnecting the said motor and the sun gear of the first planetary gear set, the planet carrier of the first gear set being connected to the sun gear of the second gear set, the planet carrier of the second gear set being connected to the sun gear of the third gear set, the planet carrier of the third gear set being connected to said end plate, the ring gears of the second and third gear sets being formed integrally on the inner surface of the said wheel support member, a drum member rotatably mounted inwardly of the wheel support member serving as the ring gear of the said first gear set and as a portion of each of the said two friction devices, means for actuating the first friction device closest to the said motor mounting means for connecting the said drum member to the motor mounting means for holding the drum member whereby the said first ring gear serves as a reaction member for the first gear set and the said motor operates the said wheel structure through a triple gear reduction, and means for selectively actuating the other friction device for connecting the said drum to the planet carrier for the first gear set whereby the first gear set is locked up and the motor operates the said wheel structure through a double gear reduction.

7. A power wheel assembly comprising an elongated annular wheel support member, mounting means at the inner end of the said wheel support member whereby the wheel support is adapted to be attached to and form part of a vehicle with the axis of the wheel support member horizontally disposed, a wheel structure surrounding the said wheel support member and arranged for rotation thereon, the said wheel structure comprising an outer rim portion, an inner drum portion adjacent the said wheel support member and an end plate interconnecting the said rim portion and the said inner drum portion and extending over the outer end of the wheel support member, motor mounting means secured within the said wheel support member adjacent the inner end thereof, a motor mounted on the said motor support means, a pair of multiple disc friction devices and three simple planetary gear sets arranged seriatim between said motor mounting means and said end plate in close axially spaced relation, each planetary gear set having a sun gear, a ring gear and planet pinions mounted on a planet carrier and in mesh with both the sun gear and ring gear, a shaft journaled in said motor mounting means and said end plate and extending through the said two friction devices and said three planetary gear sets and serving to support said sun gears, said shaft interconnecting the said motor and sun gear of the first planetary gear set, the planet carrier of the first gear set having formed integrally therewith the sun gear of the second gear set, the planet carrier of the second gear set having formed integrally therewith the sun gear of the third gear set, the planet carrier of the third gear set being connected to said end plate, an elongated internal gear portion formed integrally on the inner surface of the said wheel support member and serving as the ring gears of the second and third gear sets, an annular drum member rotatably mounted inwardly of the wheel support member and having an elongated internal toothed portion, said toothed portion serving as the ring gear of the said first gear set and as a disc holding portion for each of the said two friction devices, means for actuating the first friction device closest to the said motor mounting means for connecting the said drum member to the motor mounting means for holding the drum member whereby the said first ring gear serves as a reaction member for the said first gear set and the said motor operates said wheel structure through a triple gear reduction, and means for selectively actuating the other friction device for connecting the said drum to the planet carrier for the said first gear set whereby the first gear set is locked up and the motor operates the said wheel structure through a double gear reduction, both said friction device actuating means being disposed between said friction devices and carried by said toothed portion of said drum member.

8. A power wheel assembly comprising wheel support means, power means comprising a motor, means for mounting said motor on said support means, a wheel hub rotatably mounted on said support means, and power transmission means disposed within said support means for transmitting power from said motor to said wheel hub, said power transmission means including gear sets actuatable to transmit power at a first gear reduction defining a first speed ratio condition or a second gear reduction defining a second speed ratio condition, and means for actuating said gear sets whereby the power transmission means can be placed selectively in the said first speed ratio condition or the said second speed ratio condition or in neutral.

References Cited in the file of this patent
UNITED STATES PATENTS

| | | |
|---|---|---|
| 2,052,815 | Wilsing | Sept. 1, 1936 |
| 2,258,328 | Lee et al. | Oct. 7, 1941 |
| 2,529,330 | Double | Nov. 7, 1950 |
| 2,848,908 | Hollis | Aug. 26, 1958 |
| 2,870,655 | Rockwell | Jan. 27, 1959 |